April 17, 1951  E. P. BENTLEY ET AL  2,549,566
OPTICAL MICROMETER GAUGE
Filed May 28, 1948

INVENTORS
EDWARD P. BENTLEY &
GEORGE P. BENTLEY
BY
Herbert H. Thompson
THEIR ATTORNEY.

UNITED STATES PATENT OFFICE 2,549,566

OPTICAL MICROMETER GAUGE

Edward P. Bentley, Roslyn Heights, and George P. Bentley, Garden City, N. Y., assignors to Instrument Development Laboratories, Inc., Williston Park, N. Y., a corporation of New York Application May 28, 1948, Serial No. 29,794

7 Claims. (Cl. 88—14)

This invention relates to a micrometer for accurately measuring the thickness of transparent, semi-transparent or transluscent bodies, such as, plates of glass, plastics or other material of the above characteristics especially where physical access to one side only of the material is possible. For this purpose, we utilize some of the optical principles of the microscope.

The novel features embodied in our invention, make it possible to measure the thickness of both flat and curved material and even material which is frosted or has an irregular surface, with a high degree of accuracy. Thus by our invention the thickness of the glass of an electric light bulb or bottle may be determined from point to point around the bulb.

Our optical thickness micrometer is designed so that the exposed surface of the material under test is placed in contact with the micrometer, thereby locating the exposed surface by physical contact. Then the micrometer is accurately adjusted so as to bring a greatly reduced image of a light source or other object into focus on the inner or inaccessible surface of the material under test, using this surface as a diffusely reflecting screen or as a specular reflector, depending on the type of material being tested, the amount of such adjustment being shown on a finely divided scale. The very small image is viewed through the miscroscope optics so that it appears large to the eye.

From the drawings in which several forms of our invention are shown,

Figure 1:
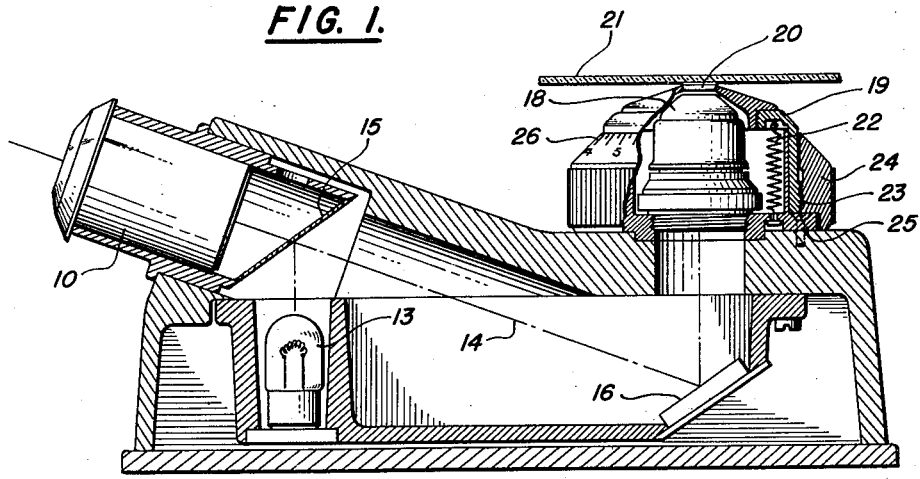
Fig. 1 is a vertical section of our optical thickness micrometer partly in elevation.
Figure 2:
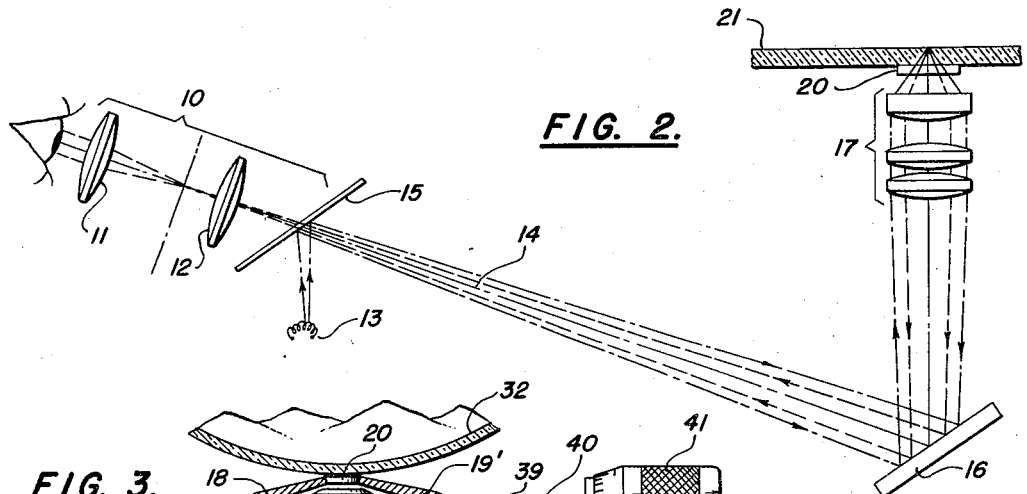
Fig. 2 is a diagram illustrating the optical principles involved.

The preferred form of our device resembles in part a high power microscope having an eyepiece 10 with the usual convex lenses 11 and 12, but having incorporated therein an image producing device which may be in the form of a small bright object such as a tiny incandescent lamp 13, having a concentrated filament, the rays from which impinge on and are reflected in the line of sight 14 from the eyepiece by a thinly silvered mirror 15. The mirror 15 is an extremely thin membrane (shown of exaggerated thickness in the drawing) so that the uncollimated light from lamp 13 does not produce double images by reflection from both surfaces if a thicker mirror were employed. The light rays 14 are shown further reflected by a mirror 16 into the objective lens system 17 (Fig. 2) within the objective 18. The objective lens system is preferably compensated for minimum aberration errors. The objective lenses 17 normally form a real image of the lamp 13 in the hole in platen 20 at its upper surface. For thin sheets, this is the zero or normal position of the platen 20, so that if a sheet of material is placed against the top of the platen this image would become visible in the eyepiece 10 (even though the material be transparent and unmarked). As stated, the mirror 15 is thinly silvered, so that the viewer through the eyepiece may see the image through the mirror, as indicated by the dash and dot lines in Figs. 1 and 2. While the real image formed at the surface is small, it is magnified in the eyepiece by the lens system employed. Surrounding the objective is a hollow housing 19 supporting a work rest or platen 20 preferably of transparent material against which the object under observation 21 is placed. The housing is normally held firmly against the micrometer by tension springs 22 and is threaded exteriorly at 23 near its lower extremity. A knurled nut 24 or thumb piece engages threads 23, and rotatably rests on a bottom plate 25. By rotating the nut, the platen may be very accurately raised and lowered and the amount of such movement measured by the circular scale 26 on the bevelled surface on top of the nut 24, which is readable upon an index (not shown) on the housing 19 supporting the platen. Initially, the scale is so correlated to the microscope as to preferably read zero when a well defined image of the lamp 13 is formed at the upper surface of the platen, or what amounts to the same thing at the exposed surface of the material 21 under test. The accuracy with which the focal point can be set by the operator depends upon the magnification of the microscope and the numerical aperture of the objective lens. The accuracy is about 0.0002" for 60 X magnification and numerical aperture of 0.17, thus giving an accuracy comparing favorably with the best micrometer gauges.

In order to measure the thickness of thin material 21 under test, it is necessary to adjust the position of the image to lie at the far surface of the body. To do this, it is obviously necessary to move either the platen and the material or the image producing lens 17 (preferably the former) an amount, for thin material, equal to the thickness thereof divided by the index of refraction thereof. For most common glass the index of refraction is about 1.50 so that a micrometer motion of 0.0667 inch indicates a thickness of 0.100 inch. When properly adjusted a sharp image will again be seen. Thus if the index of refraction is known, the micrometer motion is an accurate measure of the thickness of the substance under test. Conversely, if the thickness is known, the index of refraction can be measured. The micrometer scale can be graduated to read directly in terms of glass thickness for a selected refractive index. For measuring the thickness of material thicker than accommodated by one revolution of the micrometer gauge, it is obvious that any known techniques in the art may be employed.

With our invention a filament image will also appear whenever a discontinuity in refractive index occurs. Thus, our invention may be used to measure the thickness of a thin transparent varnish or other plastic coating on base materials.

Our invention may also be used to measure the thickness of curved glass 32 (Figs. 3 and 4) such as the thickness of a glass in an electric light bulb. To accomplish this, a drop of fluid 33 (Fig. 4) of substantially the same index of refraction as the glass should be placed between the platen and the surface. This has the effect of making the first surface a polished plane permitting forming of an image at the rear surface thereof. Since the image from the rear surface is viewed as a diffusely reflected image, the curvature of the glass surface is not a disturbing factor. In the case of a polished flat rear surface, it will be both an image formed by diffuse and by specular reflection—which images are coincident.

Figure 3:
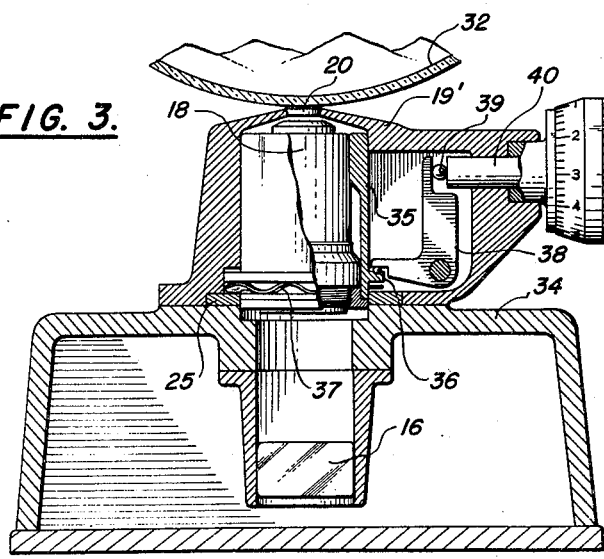
Fig. 3 is a vertical section of a modified form of our invention in which the optics are moved to obtain the second image above referred to rather than the platen or object holder.
Figure 4:
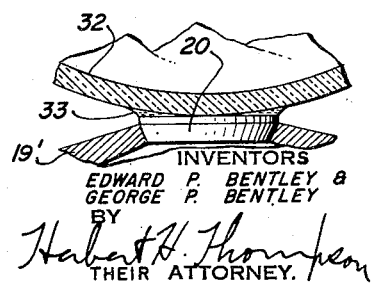
Fig. 4 is a sectional detail showing how our invention is used for measuring the thickness of a curved sheet of glass.

A modified form of our invention is shown in Fig. 3. In this figure, the housing 19' is fixed on the base 34 while the objective 18 is held in a sleeve 35 having a flange 36 resting on a spring washer 37. The height of the objective may be accurately adjusted by means of a bell crank lever 38, one arm of which rests on a ball or collar 36 while the other arm is engaged by a ball 39 in the end of an adjustable pin 40. A micrometer adjustment for the pin may be provided by the knurled nut 41 graduated as in Fig. 1 for fine reading. In this form of our invention, the objective is moved instead of the work holder for securing the two images of the lamp in the two surfaces of the object under test.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An optical thickness gauge for a transparent or translucent material comprising a platen having an aperture against the outer surface of which the material is placed to locate the near surface of said material by physical contact and establish a reference or zero position, an incandescent object within said gauge, means for focusing a reduced image of said object with respect to said platen surface, an eyepiece for magnifying and observing said image, and micrometer means for adjusting the exact position of said image so that it may be brought to a focus upon the far surface of said material, whereby the thickness of said material is indicated by the measured movement from said zero position.

2. An optical thickness micrometer gauge as claimed in claim 1 wherein said adjusting means includes a knurled nut for moving the object toward and away from the microscope, said nut having micrometer graduations.

3. An optical thickness gauge as claimed in claim 1 wherein said optical image forming means visible in the eyepiece includes a thinly silvered mirror in the path of the rays between the object and its image and between the eyepiece and image.

4. An optical thickness micrometer gauge for sheet material comprising a microscope having an eyepiece, an apertured platen against which said material is placed to establish a reference or zero position, an incandescent object therein, an optical means forming a sharp image of said object at said platen, said image being visible in the eyepiece when a surface of said material is placed against said platen, and micrometer means for adjusting the relative position of said platen and optical means away from said reference position until said image appears in the far surface of the material under test, which image is seen in said eyepiece, whereby the measured adjustment of said micrometer means shows the thickness of said material.

5. An optical thickness micrometer gauge as claimed in claim 4, wherein said adjusting means includes micrometer means for moving the micrometer objective lens toward and away from the object.

6. An optical thickness micrometer gauge for sheet material comprising a microscope having an eyepiece, an apertured platen against which said material is placed, a thinly silvered mirror between said platen and eyepiece, a concentrated light source to one side of said mirror, the rays from which are reflected thereby toward said platen, optical means forming a sharp image of said source, as reflected in said mirror, with respect to the near surface of said material, which image is visible in the eyepiece when said material is placed against said platen, and micrometer means for adjusting the relative position of said platen and optical means until said image appears at the far surface of the material under test, which image is seen in said eyepiece, whereby the measured adjustment of said micrometer means shows the thickness of said material.

7. An optical thickness gauge for a transparent or translucent material comprising a platen against which the material under test is placed, an incandescent object, means for focusing an image of said object at the surface of said platen to establish a zero position including an image magnifying and viewing means, and a thinly silvered reflector for reflecting rays from said object into said focusing means, an eyepiece for viewing said image through said thinly silvered reflector, and micrometer means for adjusting one of said platen and the focusing means so that the image of said object may be also focused on the back surface of said material, whereby the thickness of said material or its index of refraction may be measured.

EDWARD P. BENTLEY.
GEORGE P. BENTLEY.

REFERENCES CITED

The following references are of record in the file of this patent:

UNITED STATES PATENTS

| Number | Name | Date |
|---|---|---|
| 1,561,173 | Kosters | Nov. 10, 1925 |
| 1,954,755 | Heine | Apr. 10, 1934 |
| 1,999,240 | Kraft et al. | Apr. 30, 1935 |
| 2,338,981 | Straub | Jan. 11, 1944 |
| 2,437,775 | Williams | Mar. 16, 1948 |
| 2,441,107 | Turner | May 4, 1948 |
| 2,466,015 | Ewing | Apr. 5, 1949 |